(12) United States Patent
Lu et al.

(10) Patent No.: US 7,319,686 B1
(45) Date of Patent: Jan. 15, 2008

(54) FRAME SYNCHRONIZATION IN MULTI-CELL SYSTEMS WITH A DATA INTERFACE

(75) Inventors: Chun Chian Lu, Taoyuan (TW); Chin-Der Wann, Taichung (TW); Jul-Kuang Ho, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/272,193

(22) Filed: Mar. 18, 1999

(51) Int. Cl.
*H04J 3/06* (2006.01)
*H04B 7/26* (2006.01)
*H04Q 7/20* (2006.01)

(52) U.S. Cl. .................. 370/338; 370/350; 370/508; 370/514; 375/356; 375/365; 455/67.16; 455/502

(58) Field of Classification Search ............ 370/328, 370/329, 350, 503, 516, 338, 509, 514, 519, 370/508; 375/356, 371, 362, 365, 366; 455/500, 455/502, 524, 67.1, 67.6, 13.2, 67.16
See application file for complete search history.

(56) References Cited

U.S. PATENT DOCUMENTS

| | | | | |
|---|---|---|---|---|
| 3,795,763 A | * | 3/1974 | Golding et al. | 375/240.01 |
| 3,921,210 A | * | 11/1975 | Halpern | 360/40 |
| 4,656,666 A | * | 4/1987 | Piekenbrock | 455/12.1 |
| 5,014,344 A | * | 5/1991 | Goldberg | 455/51 |
| 5,128,969 A | * | 7/1992 | Baghdady | 375/347 |
| 5,289,497 A | * | 2/1994 | Jacobson et al. | 375/141 |
| 5,293,380 A | * | 3/1994 | Kondo | 370/337 |
| 5,293,645 A | * | 3/1994 | Sood | 455/456.2 |
| 5,339,334 A | * | 8/1994 | Baghdady | 375/347 |
| 5,361,398 A | * | 11/1994 | Christian et al. | 455/503 |
| 5,537,685 A | * | 7/1996 | Matsuno | 455/550 |
| 5,594,754 A | * | 1/1997 | Dohi et al. | 375/148 |
| 5,608,765 A | | 3/1997 | Tanoue | |
| 5,613,211 A | * | 3/1997 | Matsuno | 455/550 |
| 5,617,410 A | * | 4/1997 | Matsumoto | 370/342 |
| 5,621,773 A | | 4/1997 | Varma et al. | |

(Continued)

OTHER PUBLICATIONS

AT&T Microelectronics, T7264 U-interface @B1Q Transceiver, Data Sheet, Apr. 1998.

(Continued)

*Primary Examiner*—Alpus H. Hsu
(74) *Attorney, Agent, or Firm*—Finnegan, Henderson, Farabow, Garrett & Dunner LLP

(57) ABSTRACT

A method of timing in a multi-cell system requiring synchronization of frames in transmission is provided. Transceivers of a wired data interface between a central controller and multiple base stations are synchronized to a frame timing clock up to a difference in propagation delays between the central controller and multiple base stations. The propagation delays are considered as constants, are measured, and are stored in each base station. A unique word is regularly inserted in the data transmitted by the central controller, at a fixed interval. When this unique word is detected by the base station within a fixed period of the frame timing clock, a frame signal delay is initiated at the next rising edge of each frame timing clock. This frame signal delay is equal to the period of the frame timing clock minus the propagation delay. At the end of the frame delay, the frame data is transmitted, and all frames are simultaneously transmitted from different base stations.

22 Claims, 5 Drawing Sheets

U.S. PATENT DOCUMENTS

| | | | |
|---|---|---|---|
| 5,666,366 A * | 9/1997 | Malek et al. ............... | 370/505 |
| 5,677,935 A | 10/1997 | Karino | |
| 5,680,421 A | 10/1997 | Shiino et al. | |
| 5,722,080 A * | 2/1998 | Kondo ........................ | 455/502 |
| 5,802,046 A * | 9/1998 | Scott ........................... | 370/280 |
| 5,805,583 A * | 9/1998 | Rakib ......................... | 370/342 |
| 5,828,659 A * | 10/1998 | Teder et al. ................ | 370/328 |
| 5,878,034 A * | 3/1999 | Hershey et al. ............ | 370/321 |
| 5,905,718 A * | 5/1999 | Kurokami et al. .......... | 370/328 |
| 5,912,886 A * | 6/1999 | Takahashi et al. .......... | 370/350 |
| 5,917,852 A * | 6/1999 | Butterfield et al. ......... | 375/141 |
| 5,920,557 A * | 7/1999 | Hirata ........................ | 370/350 |
| 5,920,591 A * | 7/1999 | Fukasawa et al. .......... | 375/208 |
| 5,959,980 A * | 9/1999 | Scott ........................... | 370/280 |
| 5,969,679 A * | 10/1999 | Bolliger et al. ............. | 342/464 |
| 5,978,369 A * | 11/1999 | Silvestre et al. ............ | 370/350 |
| 6,014,376 A * | 1/2000 | Abreu et al. ................ | 370/350 |
| 6,122,512 A * | 9/2000 | Bodin ........................ | 455/440 |
| 6,205,157 B1 * | 3/2001 | Galyas et al. ............... | 370/503 |
| 6,266,529 B1 * | 7/2001 | Chheda ....................... | 455/436 |
| 6,449,290 B1 * | 9/2002 | Williars et al. ............. | 370/507 |
| 6,480,483 B2 * | 11/2002 | Yahata et al. ............... | 370/350 |
| 6,483,825 B2 * | 11/2002 | Seta ........................... | 370/335 |
| 6,563,856 B1 * | 5/2003 | O'Shea et al. .............. | 375/130 |
| 6,654,432 B1 * | 11/2003 | O'Shea et al. .............. | 375/354 |

OTHER PUBLICATIONS

Lu, C. C., "Frame Synchronization and Capacity of DECT Systems", CCL Technical Journal, May 1996.

LXP710, HDSL Framer/Mapper for 1168kbps Applications, Data Sheet, Jan. 1998.

* cited by examiner

Frame Synchronization:

At each RFP (Base Station): count = 64 – 512k * Delay

For $BS_1$: $count_1 = 64 - 512k * Delay_1$
For $BS_2$: $count_2 = 64 - 512k * Delay_2$

FRAME SYNCHRONIZATION IN MULTI-CELL SYSTEMS WITH A DATA INTERFACE

BACKGROUND OF THE INVENTION

A. Field of the Invention

The present invention relates to signal synchronization in multi-cell communication systems. The disclosed method and apparatus are applicable to all communication systems requiring frame synchronization, especially those using synchronized interfaces. These systems include, but are not limited to, Time Division Multiple Access (TDMA) and Code Division Multiple Access (CDMA) systems. The present invention is intended for use in, for example, wireless communications, such as cordless telephone systems; low-tier, low-power, multi-cell personal communications services; wireless local loops (WLL); wireless local area networks (LAN); and wireless private branch exchanges (PBX).

B. Description of the Related Art

FIG. 1 shows a typical configuration of a conventional mobile communication system. A central control fixed part (CCFP) 10 is typically connected to several radio frequency parts (RFP) 20, 30, and 40, via two-way communication links 120. The CCFP may also be connected to a control terminal 50. In the particular configuration shown in FIG. 1, the CCFP is connected to another processor 60, which is connected to a telephone network 80. It is possible to connect, for example, communication devices 70 directly to processor 60 as shown.

In conventional usage, the CCFP 10 and RFPs 20, 30, and 40 may also be referred to as a master station and slave base stations, respectively. The RFPs typically have an effective signal transmission radius 90, which defines their respective areas of coverage, or cells, 100, shown in FIG. 1 as dashed circles. Within these cells 100 are located mobile communication devices 110, which are capable of two-way or one-way wireless communication with the RFP in whose area they reside. These mobile communication devices 110 include, but are not limited to, cordless telephones, cellular telephones, pagers, personal digital assistants (PDA), and mobile computers.

In a mobile communication system such as shown in FIG. 1, the CCFP 10 communicates with RFPs 20, 30, and 40 via an Integrated Services Digital Network (ISDN) communication protocol. RFPs 20, 30, and 40 typically communicate with devices 110 via a Digital European Cordless Telecommunications (DECT) communication protocol. Both of these communication protocols are known to those skilled in the telecommunications art, and will not be further described here. Both the ISDN and DECT protocols transmit data in structured frames. It is desirable for a given frame of data transmitted by RFPs 20, 30, and 40 to be transmitted at the same time by all RFPs; this is known as frame synchronization.

Frame synchronization (FS) in a multi-cell system is a necessary step to reduce interference between users and signal acquisition time. Unfortunately, because the RFPs are different distances from the CCFP, even if the CCFP transmits a synchronization signal, the signal will arrive at the RFPs at different times due to different propagation delays from the CCFP to the respective RFPs. Based on an acceptable interference criterion, it has been shown that the maximum timing error allowed for FS is 11 microseconds for the DECT protocol (e.g., in Lu, C. C., "Frame synchronization and capacity of DECT Systems", CCL Technical Journal, 1996). If propagation delays are longer than this time, additional steps are needed for FS besides a transmitted synchronization signal.

Conventionally, the principal steps needed to implement FS are measuring the unique signal time delay between master and slave bases, and adjusting frame clocks at the slave bases so that the transmission times from all base stations are the same. This latter subject has been treated in the prior art and there are many methods of implementation. One approach taken by a CDMA system with multiple bases is using a synchronized clock derived from a global positioning system (GPS) signal. Another conventional approach is to update the FS when the system load is low, e.g., at midnight.

Another approach for FS involves additional wiring, shown as wiring 130 in FIG. 1, which is dedicated for frame synchronization only. Such synchronization may be implemented by an independent star network, and this method performs satisfactorily. Using this system, the time delays for each base station may be compensated for with high accuracy, but the required extra wiring 130 for FS only is wasteful.

SUMMARY OF THE INVENTION

Accordingly, the present invention is directed to a method and apparatus for synchronizing transmission of data frames from a plurality of base stations that substantially obviates one or more of the problems due to the limitations and disadvantages of the related art.

Advantages of the present invention include: regular and automatic maintenance of frame synchronization among base stations of a multi-cell communication system; improved efficiency on signal handoff; and improved performance against interference.

Additional features and advantages of the invention will be set forth in part in the description which follows, and in part will be obvious from the description, or may be learned by practice of the invention. The objectives and other advantages of the invention will be realized and attained by means of the elements and combinations particularly pointed out in the written description and claims hereof, as well as the appended drawings.

To achieve these and other advantages and in accordance with the purpose of the invention, as embodied and broadly described herein, the invention comprises a method for synchronizing transmission of data frames from a plurality of base stations which receive the data frames at different times from a central unit due to different signal propagation delays, including: determining a signal propagation delay to each base station; storing the signal propagation delay in each respective base station; transmitting known data from the central unit to the base stations to initiate frame synchronization; and delaying transmission of the data frames from each base station by an amount determined from the stored signal propagation delay.

Another embodiment of the invention comprises a system for synchronizing transmission of data frames from a plurality of base stations which receive the data frames at different times from a central unit due to different signal propagation delays, including: means for storing the signal propagation delay in each respective base station; means for transmitting known data from the central unit to the base stations to initiate frame synchronization; and means for delaying transmission of the data frames from each base station by an amount determined from the stored signal propagation delay.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 2b is a timing diagram explaining the frame synchronization method of the present invention, with reference to the devices in FIG. 2a.

DESCRIPTION OF THE PREFERRED EMBODIMENTS

Figure 1:
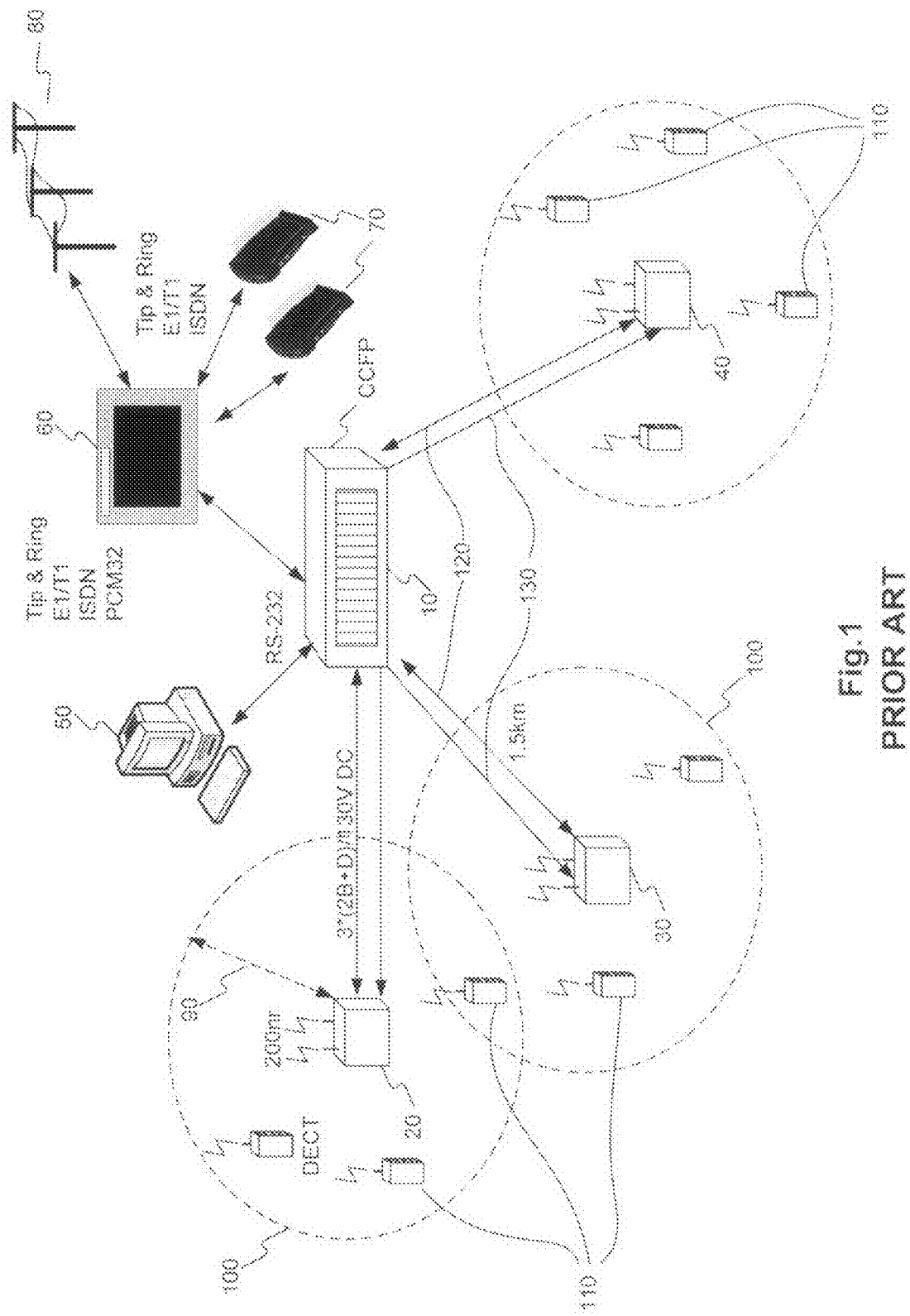
FIG. 1 is an illustration of a conventional wireless communication system.

Reference will now be made in detail to the present preferred embodiments of the invention, examples of which are illustrated in the accompanying drawings. Wherever possible, the same reference numbers will be used throughout the drawings to refer to the same or like parts.

In order to synchronize frames in the present invention, the delay between transmission of a signal from CCFP 10 and its reception at each RFP must be known. Each of RFPs 20, 30, and 40 will have a unique delay due to its unique distance from the CCFP 10. These delays are constants and can be measured either by a delay measuring device or by a distance measurement at initial installation.

In the latter case, the delay is calculated by the following formula:

Delay=(Distance from *RFP* to *CCFP*)/(phase velocity of *EM* wave in the wire).

A typical phase velocity in the wire is about $2*10^8$ meters/second. Once the propagation delay has been determined for each base station, this value is stored in a nonvolatile memory or register of conventional design within the base station. Alternately, a product of the propagation delay and another system parameter, such as a clock frequency, may be stored in each base station.

The present invention relates to a new method of timing in a multi-cell system requiring synchronization of frames in transmission. In a conventional method, base stations are "synchronized" to within the difference between the shortest delay and the longest delay. In the two station example of FIG. 2a, base stations 20 and 30 would be synchronized to within (Delay$_2$- Delay$_1$) seconds. The conventional system will perform satisfactorily if the delay difference is as small as in Pico-cell systems; in these cases, the delays can be approximated as zero. Because these delays are known, the present invention allows the delays to be compensated for, so that all frames are transmitted at the same time, but without the use of extra wiring 130 or the use of a GPS signal.

One embodiment of the invention allows the signals received at each base station to be "moved backward" by the aforementioned time delay so that all clocks in the RFPs are synchronous to a master timing clock (MTC) in the CCFP. This allows all base stations to transmit a frame at the same time, notwithstanding the propagation delays. These clocks in the RFPs are derived from the MTC signal, which is transmitted from the CCFP to all RFPs. As such, a "local" MTC signal in an RFP may be referred to as a regenerated MTC and/or an MTC replica.

To implement this idea, a unique word is regularly inserted in the frames transmitted from the CCFP to the RFPs. This unique word should be long enough so that it would not occur within normal data frames. When this unique word is detected by the receiver circuit at the base station, a fast counter is initiated (at rate F Hz) at the next rising edge of the regenerated MTC replica, which has a lower frequency of S Hz. The fast counter frequency F should be a known integer multiple of the MTC frequency S. Such a multiple could be a number easily implemented by a conventional digital counter, such as 64, 128, 256, etc., but it need not be limited to such numbers.

Figure 2A:
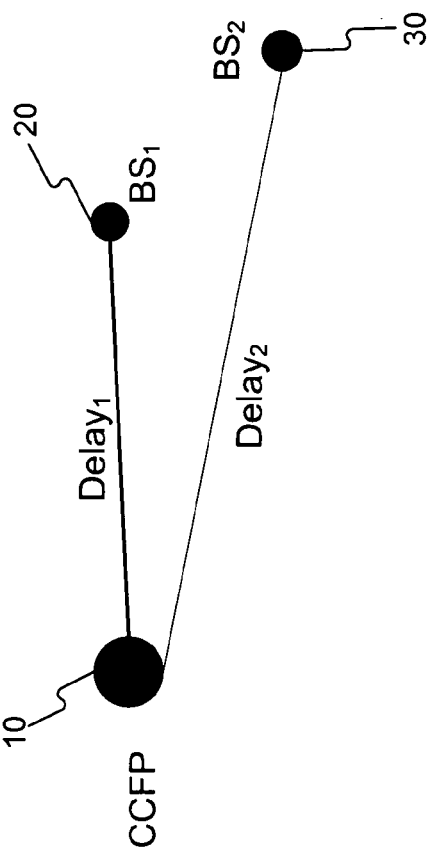
FIG. 2a is an exemplary arrangement among a central control fixed part and two remote frame processors.
Figure 2B:
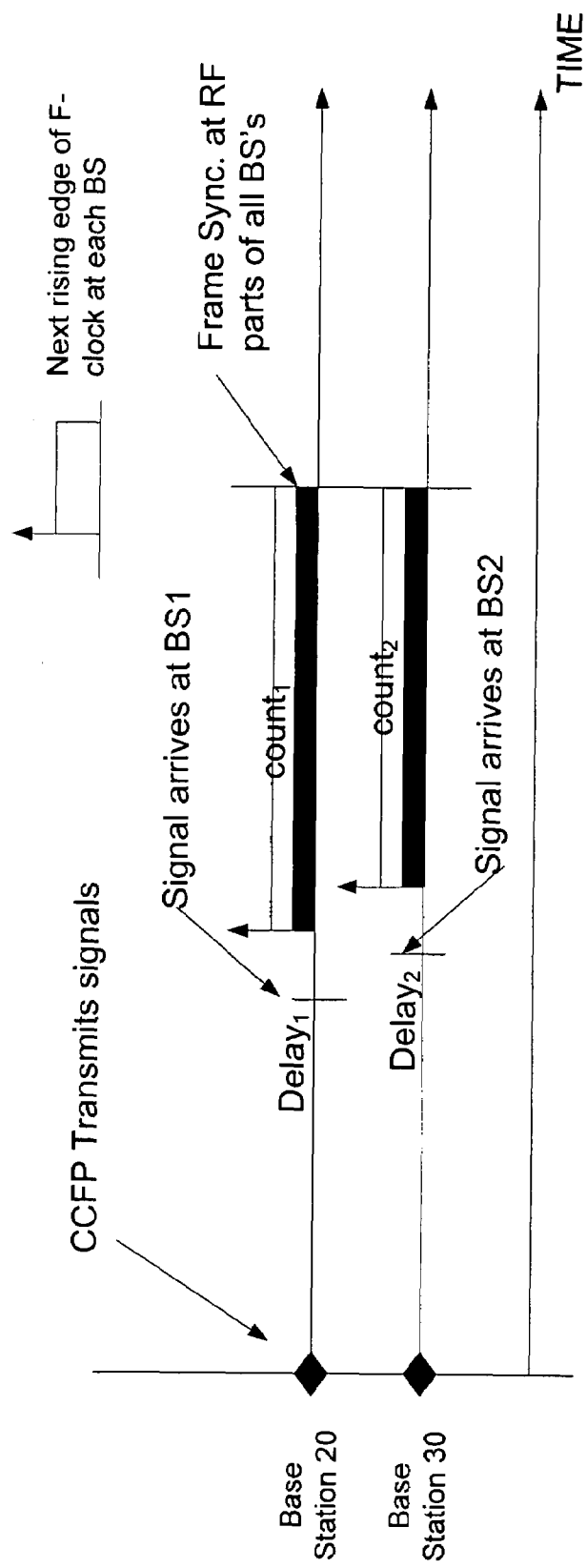

FIG. 2b is a timing diagram including time lines for signals transmitted from the CCFP to base stations 20 and 30. As may be seen from FIG. 2b, the rising edges of the MTC replica are delayed relative to one another, due to Delay$_1$ and Delay$_2$. However, if the master clock frequency S is chosen such that its period is sufficiently longer than any of the delays to the base stations, then the next rising edge of the MTC should be the same one received at all the base stations. Knowing that the MTC period is the same for all base stations, the relative delay between base stations may be removed by subtracting that portion of the MTC period which corresponds to the delay of each base station. This remainder of the MTC period is loaded into a counter, which begins at the rising edge of the MTC replica, and counts at frequency F until:

Count=(*F/S*)−(*F*\*Delay).

When the value Count is reached, the frame data is transmitted from the base stations 20, 30, 40 to the remote devices 110, and all frames from different base stations are synchronized.

The invention will be further clarified by the following examples, which are intended to be purely exemplary of the invention. In FIG. 2a, and in the example below, S=8 kHz, and F=512 kHz. Thus, F/S=64, the MTC period is 0.125 milliseconds, and that portion of the MTC period which corresponds to the various delays is (512 kHz\*Delay). Of course, F and S should be chosen so that the product (512 kHz\*Delay) never exceeds F/S. As earlier mentioned, F is chosen to be an integer multiple of S, but the product (512 kHz\*Delay) will seldom be an integer, so rounding error is introduced. This rounding error means that the frames will be synchronized to a timing resolution of at least half of the fast clock period which is 1/(2\*512000)<1 microsecond for the above example. This timing resolution can be arbitrarily increased by increasing the fast clock frequency F.

Those skilled in the art will appreciate that each time the above frame synchronization is performed, a transmission delay of up to the period of the master timing clock, which is 0.125 milliseconds in the above example, is introduced in the frame data transmitted by the base station.

A specific example of the invention will now be discussed. In Integrated Services Digital Network (ISDN) protocol, a T7264 U-transceiver (UT) (e.g., AT&T Microelectronics, T7264 U-interface 2B1Q Transceiver, features of which are described in Advance Data Sheet, April 1998) transmits data from one processor to the other at a bit rate of 160 kbps. It is possible to have 3 UTs at each end of the RFP and the CCFP. Each UT operates in either an LT or NT mode. All UT's in the LT mode are synchronized to the MTC. In LT mode, an on-chip digital phase lock loop phase locks an F-clock output to the MTC at 8 KHz supplied externally. Therefore all F-clocks of UT's in the CCFP are synchronized. LT mode is suitable for the CCFP. NT mode timing is slave to the LT mode timing and suitable for the RFP.

In the NT mode the F-clock synchronizes to the signal received from the UT in LT mode through the U-interface. Therefore the F-clocks at different RFPs have fixed delays proportional to the respective distances from the CCFP. These F-clocks can be used to compensate for the fixed delays and synchronize frames from all base stations. For better resolution a C-clock (synchronized to F-clock) at a higher rate of 512 KHz can be used. The timing resolution is at least half of the C-clock period which is $1/(2*512000)$ =1 microsecond.

Figure 3:
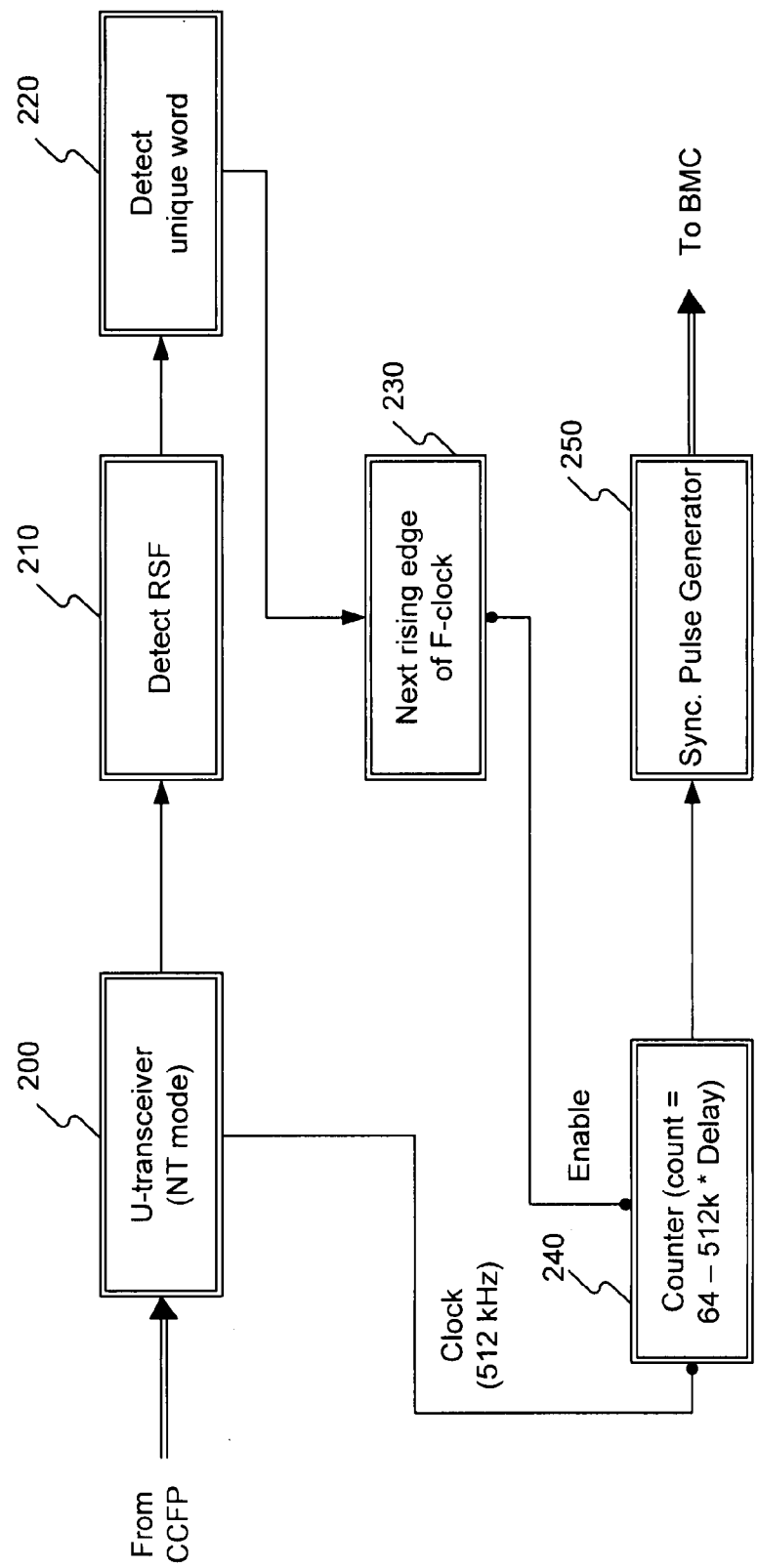
FIG. 3 is a circuit in a remote frame processor shown in block diagram form for generating a synchronized pulse, given the signal delay.

FIG. 3 illustrates a frame synchronization adjustment and unique word detection circuit in a base station according to the above scheme. U-transceiver 200 operated in NT mode receives data frames from CCFP 10. A U-transceiver 200 or associated circuitry generates a fast clock signal at 512 kHz from the received master clock signal. Detector 210 detects a receive superframe (RSF) mark, indicating the start of a superframe of data. Detector 220 detects the unique word used to trigger the frame synchronization. Upon such detection, a rising edge detector 230 detects the next rising edge of the master clock, and enables counter 240 to begin counting at 512 kHz. Counter 240 counts up to a previously calculated count equal to (64-512000*delay). Upon reaching this count, a signal pulse generator 250 is triggered, enabling frame synchronization via a Burst Mode Controller (BMC) (not shown).

The specific implementation of the above-referenced functional elements will be apparent to one skilled in the electronics art. For example, unique word detector 220 could be implemented by a shift register connected to combinational logic gates. Rising edge detector 230 could be implemented by a conventional edge detector integrated circuit. Counter 240 could be implemented by a discrete digital counter integrated circuit. Alternatively, some of the above-referenced functional elements shown in FIG. 3 could be implemented by microprocessor or programmable array logic.

In this example, at the DECT RFPs (base stations), the frames of data after synchronization are converted, or mapped, from ISDN format to DECT frames for wireless transmission to mobile terminals, or handsets. In such a DECT application, the BMC is a custom integrated circuit that performs the DECT physical layer and medium access control (MAC) layer time-critical functions. A BMC is typically used in base station products which comply with DECT standards. After determining the fixed delay above, this delay is introduced for each frame of incoming ISDN data. This fixed delay is then periodically updated as described above.

The relative delays between base stations do not adversely affect operations to achieve FS, because all signals are expected to arrive in the same F-clock period. For example, the message (containing unique word) delay is the same as the master clock delay. Similarly, the processing time is the same for all base stations due to the same processing circuitry as shown in FIG. 3. For example, the message buffering time in the UT should be the same. The processing time of the various detectors is also the same.

The total of these time delays will not affect the final frame timing so long as the moment of detection is within a fixed master clock period. This is expected because the period in the example is 0.125 ms which is long enough for these processes. Therefore, the next rising edge of the master clock after the detection of the message should be the same edge in all UT's at the base stations. The exact time of detection is not important because the accuracy of timing is not determined by this time but by the master clock and fast clock only.

The present invention is not limited to the ISDN protocol in the above example. It is readily adaptable to other data transmission protocols. According to the data sheet of LXP718 (LXP710, HDSL Framer/Mapper for 1168 kbps Applications, Data Sheets, January 1998), a High bit-rate Digital Subscriber Line (HDSL) protocol provides programmable mapping between E1 Interface and HDSL interfaces, equivalent to the U-interface and K2-interface of ISDN. There are also two modes of operation, LTU and NTU. The outputs of synchronized clocks chosen for HDSL FS are E1FRMO at 8 KHz and E1CLKO at 2.048 MHz corresponding to the master clock and fast clock respectively. E1CLKO is four times faster than the fast clock, and therefore has a correspondingly higher timing resolution.

There are two ways of implementing the above-referenced unique word, which indicates that frame synchronization is to begin. Such an indicator can be: 1) a unique word sent as a frame through the data channel of the interface; or 2) a unique setting of the unused pattern of bits in a frame provided by the transceiver design. The former method involves a bandwidth reduction in the system, because one frame is periodically lost due to frame synchronization. However, as described below, this first method is somewhat easier to implement.

Other preferred designs of implementing the indicator word are of the second category. Careful study of the transceiver specifications are required to determine an appropriate way to encode a unique word. For example, in UT, in every K2 frame and hence every f-clock period, there are some unused bit patterns, such as eoc bits, and more specifically i1-i8 bits in UM1,2 octets. For easy implementation, those bits which are transparent between K2-interface and U-interface are preferable. These can be used to indicate the beginning of a DECT frame. In an HDSL frame, the last 45 Z-bits are undefined and can be used to hold a unique word.

In a mobile communication system such as shown in FIG. 1, CCFP 10 communicates with RFPs 20, 30, and 40 via an ISDN protocol. RFPs 20, 30, and 40 communicate with remote devices 110 via a DECT protocol. A frame in DECT is 10 ms long and is divided equally into outbound and inbound bursts. For a master clock of 8 kHz, 10 ms is 80 clock periods. UT formats data into frames of 1.5 ms and a superframe of 12 ms. Thus 8 U-frames form a superframe. Each superframe has a tx superframe (TSF) mark and an rx superframe (RSF) mark. For frame synchronization a signal is needed to indicate the beginning of a DECT frame. A particular TSF is used to set the beginning of a DECT frame. Frames of UT and DECT are unequal, but the duration of 5 U-superframes is equal to 6 DECT frames. The coincidence period of the two is therefore 60 ms.

All DECT frames are defined to start at the beginning of the same TSF. The particular TSF used for frame synchronization is generated every 5 superframes, and these TSFs are identified by a unique word in their first frame data. To identify these coincidence TSF marks a circuit shown in FIG. 4 counts every fifth TSF, or a 6*80 F-clock cycles.

Figure 4:
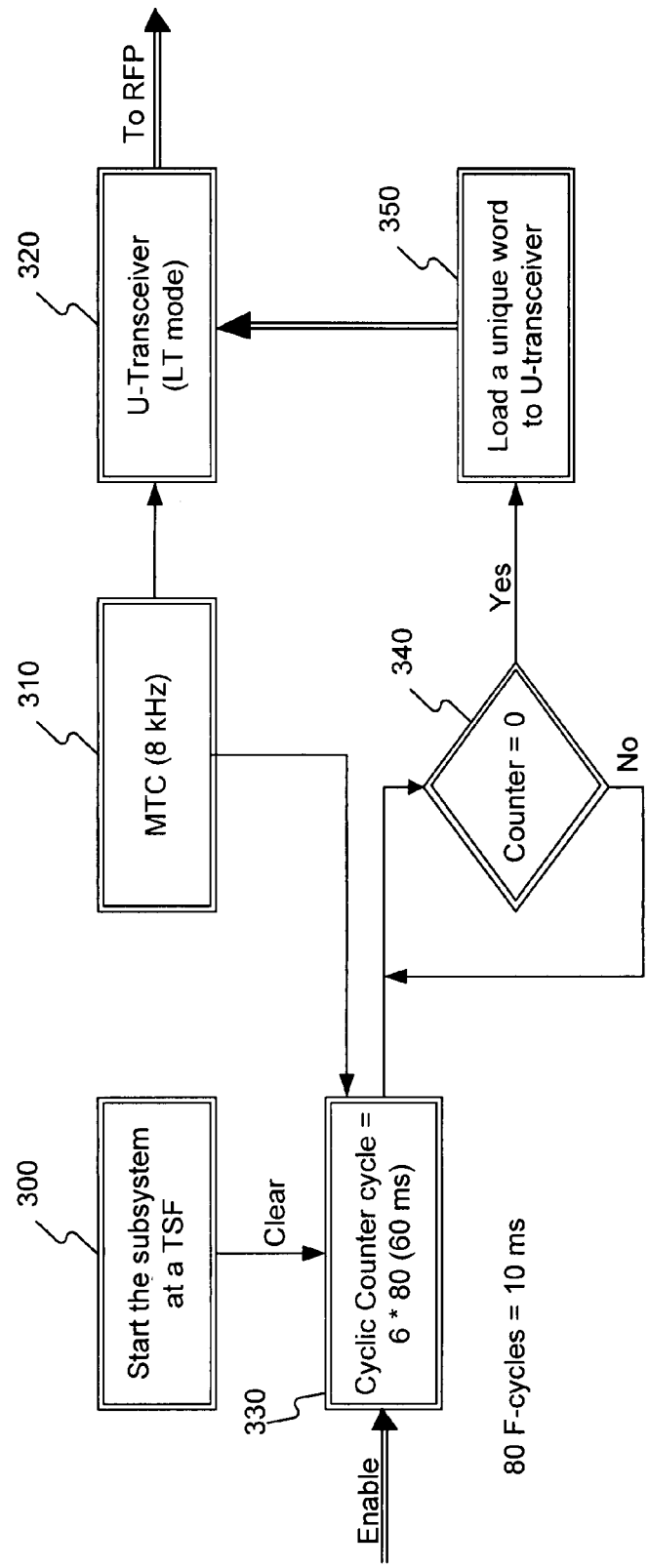
FIG. 4 is a circuit, shown in block diagram form in the central control fixed part for transmitting a unique synchronization word.

With reference to FIG. 4, an element 300 initializes the counting circuit at a TSF, and it outputs a signal which clears a cyclic counter 330 upon the TSF occurring. A master clock 310 provides the MTC signal at a frequency S of 8 kHz to counter 330 and a U-transceiver 320 operating in LT mode to transmit data to an RFP. The cyclic counter in this example counts a complete cycle every 60 ms. When counter 330 completes a counting cycle, a decision element 340 instructs a register 350 to load a unique word into U-transceiver 320 for transmission.

If U-transceiver 320 sends the unique word in a data frame during every coincidence cycle (60 ms), one out of 40 U-frames is seized for a non-data purpose. The system may not tolerate this data loss. If the interval of seizure is extended by increasing the size of the counter to multiples of the coincidence cycle, the associated data loss becomes tolerable. However, the regular seizure of a frame may complicate the design of data flow. As previously mentioned, an alternative to seizing a frame of data is to embed the unique word in unused bits within the frame data structure.

It will be apparent to those skilled in the art that various modifications and variations can be made in the method of the present invention and in its implementation without departing from the scope or spirit of the invention. As an example, the method is not limited to cellular telephony applications, but may be used in any communication system where it is desirable for multiple remote parts at different distances from a central part to be synchronized. Applications include fiber optic communications and distributed networks, such as the internet. Also, communication protocols other than ISDN, DECT, and HDSL are contemplated.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for synchronizing transmission of first data frames from a plurality of base stations which receive second data frames at different times from a central unit due to different signal propagation delays, comprising:
   determining a signal propagation delay to each base station;
   storing the signal propagation delay in each respective base station;
   transmitting known data in the second data frames from the central unit to the base stations to initiate frame synchronization; and
   delaying transmission of the first data frames from each base station by an amount determined from the stored signal propagation delay.

2. The method of claim 1, wherein determining includes measuring the signal propagation delay with a delay measuring instrument.

3. The method of claim 1, wherein determining includes measuring a distance to each base station and calculating the signal propagation delay by dividing the measured distance by a phase velocity.

4. The method of claim 1, wherein transmitting includes periodically transmitting the known data.

5. The method of claim 4, wherein transmitting further includes writing a unique word detectable by the base stations in a data-carrying portion of a frame of data.

6. The method of claim 4, wherein transmitting further includes embedding a unique word detectable by the base stations in a non-data-carrying portion of a frame of data.

7. The method of claim 1, wherein the known data includes a master clock signal having a period, and wherein said amount equals the period of the master clock signal minus a value corresponding to the stored propagation delay.

8. A method for synchronizing transmission of first data frames from a plurality of base stations which receive second data frames at different times from a central unit due to different signal propagation delays, comprising:
   receiving a master clock signal and a unique word at all base stations;
   deriving a fast clock signal from the master clock signal at all base stations;
   detecting the unique word at each base station to begin frame synchronization; and
   delaying transmission of the first data frames from each base station by an amount determined from a stored signal propagation delay, a frequency of the master clock signal, and a frequency of the fast clock signal.

9. The method of claim 8, wherein said amount in each base station equals a period of the master clock signal minus a value corresponding to the stored propagation delay for the respective base station.

10. The method of claim 8, wherein the frequency of the fast clock signal is an integer multiple of the frequency of the master clock signal.

11. The method of claim 9, wherein delaying includes:
    detecting a next rising edge of the master clock signal after detecting the unique word in each base station; and
    effecting a delay in each base station equal to a period of the master clock signal minus the stored propagation delay for the respective base station.

12. The method of claim 11, wherein effecting a delay includes counting to a ratio of the frequency of the fast clock signal to the frequency of the master clock signal, minus a product of the frequency of the fast clock signal and the stored propagation delay.

13. A system for synchronizing transmission of first data frames from a plurality of base stations which receive second data frames at different times from a central unit due to different signal propagation delays, comprising:
    means for storing the signal propagation delay in each respective base station;
    means for transmitting known data in the second data frames from the central unit to the base stations to initiate frame synchronization; and
    means for delaying transmission of the first data frames from each base station by an amount determined from the stored signal propagation delay.

14. The system of claim 13, wherein the means for transmitting periodically transmits the known data.

15. The system of claim 14, wherein the means for transmitting further includes means for writing a unique word detectable by the base stations in a data-carrying portion of a frame of data.

16. The system of claim 14, wherein the means for transmitting further includes means for embedding a unique word detectable by the base stations in a non-data-carrying portion of a frame of data.

17. The system of claim 13, wherein the known data includes a master clock signal having a period, and wherein said amount equals the period of the master clock signal minus a value corresponding to the stored propagation delay.

18. An apparatus for synchronizing transmission of first data frames from a plurality of base stations which receive second data frames at different times from a central unit due to different signal propagation delays, comprising:
  means for receiving a master clock signal and a unique word at all base stations;
  means for deriving a fast clock signal from the master clock signal at all base stations;
  means for detecting the unique word at each base station to begin frame synchronization; and
  means for delaying transmission of the first data frames from each base station by an amount determined from a stored signal propagation delay, a frequency of the master clock signal, and a frequency of the fast clock signal.

19. The apparatus of claim 18, wherein said amount in each base station equals a period of the master clock signal minus a value corresponding to the stored propagation delay for the respective base station.

20. The apparatus of claim 18, wherein the frequency of the fast clock signal is an integer multiple of the frequency of the master clock signal.

21. The apparatus of claim 19, wherein the means for delaying includes:
  means for detecting a next rising edge of the master clock signal after detecting the unique word in each base station; and
  means for effecting a delay in each base station equal to a period of the master clock signal minus the stored propagation delay for the respective base station.

22. The apparatus of claim 21, wherein the means for effecting a delay includes means for counting to a ratio of the frequency of the fast clock signal to the frequency of the master clock signal, minus a product of the frequency of the fast clock signal and the stored propagation delay.

* * * * *